No. 821,328. PATENTED MAY 22, 1906.
H. D. BARTLETT.
HAND OPERATED TOOL.
APPLICATION FILED SEPT. 7, 1905.
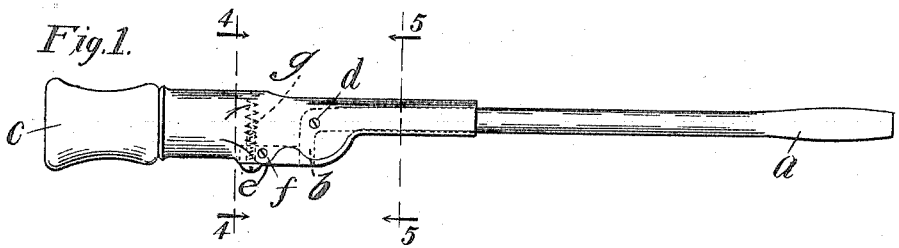
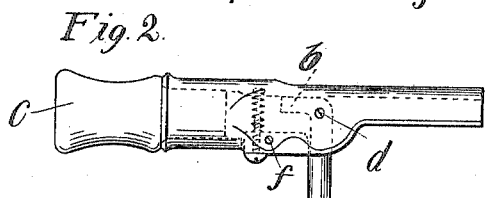
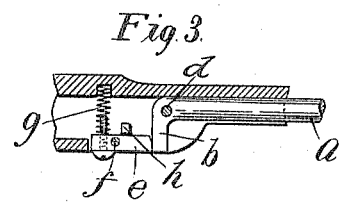
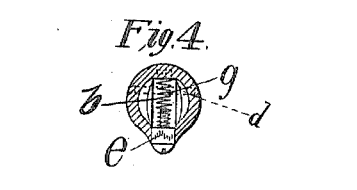
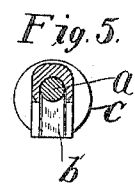
WITNESSES
Chas. F. Bassett
Leon Stroh
INVENTOR
Harry D. Bartlett
By G. L. Cragg
ATT.

UNITED STATES PATENT OFFICE.

HARRY D. BARTLETT, OF CHICAGO, ILLINOIS.

HAND-OPERATED TOOL.

No. 821,328.      Specification of Letters Patent.      Patented May 22, 1906.

Application filed September 7, 1905. Serial No. 277,347.

*To all whom it may concern:*

Be it known that I, HARRY D. BARTLETT, a citizen of the United States, residing at Chicago, in the county of Cook and State of Illinois, have invented a certain new and useful Improvement in Hand-Operated Tools, of which the following is a full, clear, concise, and exact description, reference being had to the accompanying drawings, forming a part of this specification.

My invention relates to tools that are manually rotated in their operation—such, for example, as screw-drivers—and has for its object the provision of an improved mounting for the handle of the tool that will permit the stem of the tool to be disposed longitudinally of the handle or transverse of the handle, the device of my present invention being an improvement upon the invention shown in Patent No. 428,662, granted to Marcus J. Bartlett May 27, 1890.

The device of my invention includes a short angular extension of the stem of the tool and a displaceable abutment adapted to engage the top of said angular extension when said stem is disposed longitudinally of the handle, whereby the handle and stem are very securely maintained in alinement. Upon the displacement of this abutment the stem of the tool may be angularly disposed to the handle to secure better purchase upon the tool.

I will explain my invention more fully by reference to the accompanying drawings, showing the preferred embodiment thereof, in which—

Figure 1 is a longitudinal elevation with the tool blade and handle in line. Fig. 2 is a view in elevation with the tool blade and handle at right angles to each other. Fig. 3 is a longitudinal sectional view of so much of the structure as is necessary to fully illustrate my invention. Fig. 4 is a sectional view on line 4 4 of Fig. 1. Fig. 5 is a sectional view on line 5 5 of Fig. 1.

Like characters are indicated by similar characters of reference throughout the different figures.

The blade $a$ of the tool (which tool in this instance is a screw-driver) is bent at the top to form a right-angular extension $b$, and the elbow between the main and extension portions of the blade is pivotally connected to the handle $c$ at a point intermediate between the ends of the handle, a pintle $d$ passing through the sides of the handle and through the elbow of the blade for this purpose. The handle is grooved below the pintle and a slight distance above the pintle, this groove permitting of the rotation of the blade, so that the main and angular extensions of the blade may engage the bottom of the groove according to the adjustment of the tool. A displaceable abutment $e$ is pivoted at $f$, one end of the abutment serving to engage the top of the extension $b$ near its free end, a spring $g$ serving normally to maintain this engagement when the blade of the tool is longitudinal of the handle, the pivot $f$ being between the spring $g$ and that end of the abutment $e$ that engages the extension $b$. A lug $h$ prevents the spring $g$ from thrusting the abutment too far toward the pintle $d$, so that the engagement between the abutment and the extension $b$ may be securely maintained to hold the blade in line with the handle. When it is desired to increase the purchase upon the tool, the blade should be placed at right angles to the handle, to which end the abutment is manually depressed in opposition to the spring $g$, so as to release the engagement between said abutment and the extension $d$, whereafter the blade may be swung at right angles to the handle.

It will be seen that by engaging the top surface of the extension $b$ with a locking device instead of engaging the side, as is the case with the device of the aforesaid patent, a very positive and sure connection is afforded between the handle and the blade without weakening the blade structure.

Having thus described my invention, I claim as new and desire to secure by Letters Patent—

1. A tool, including a handle, the tool-blade pivoted between the ends of the handle and adapted to be placed substantially in line with the handle and to be swung at an angle to the handle and provided with an angular extension, an abutment pivoted upon the handle and serving to engage the top of the extension to hold the handle and tool-blade in line, a spring for normally maintaining the abutment in engagement with said extension when the tool blade and handle are in line, and a lug provided upon the handle and serving to engage the abutment to prevent the spring from moving the abutment out of its said normal position.

2. A tool, including a handle, the tool-blade pivoted between the ends of the handle and adapted to be placed substantially in line with the handle and to be swung at an angle to the handle and provided with an angular extension, a manually-operable abutment pivoted upon the handle and serving to engage the top of the extension to hold the handle and tool-blade in line, and a spring for normally maintaining the abutment in engagement with said extension when the tool blade and handle are in line said abutment when manually operated acting in opposition to said spring and being then removed from the path of said angular extension as the tool-blade is rotated.

3. A tool, including a handle, the tool-blade pivoted between the ends of the handle and adapted to be placed substantially in line with the handle and to be swung at an angle to the handle and provided with an angular extension, and a manually-operable abutment pivoted upon the handle and serving to engage the top of the extension to hold the handle and tool-blade in line said abutment when manually operated escaping said angular extension as the tool-blade is rotated.

4. A tool, including a handle, the tool-blade pivoted between the ends of the handle and adapted to be placed substantially in line with the handle and to be swung at an angle to the handle and provided with an angular extension, and a manually-operable locking device engaging the top of the extension to maintain the blade in line with the handle said locking device, when manually operated, escaping said extension as the tool-blade is rotated.

In witness whereof I hereunto subscribe my name this 4th day of September, A. D. 1905.

HARRY D. BARTLETT.

Witnesses:
G. L. CRAGG,
LEON STROH.